Patented Apr. 1, 1947

2,418,109

UNITED STATES PATENT OFFICE 2,418,109

PROCESS FOR PURIFICATION OF CERTAIN PERCHLOROLEFINS

James S. Sconce, Niagara Falls, N. Y., assignor to Hooker Electrochemical Company, Niagara Falls, N. Y., a corporation of New York No Drawing. Application February 1, 1945, Serial No. 575,739

7 Claims. (Cl. 260—654)

My process relates more particularly to purification of perchlorolefins of the type in which every carbon atom in the molecule is joined to one or more other carbon atoms by a linkage including a double bond. Examples of such perchlorolefins are tetrachlorethylene, hexachlorbutadiene, octachlorhexatriene, etc. Tetrachlorethylene may be made by chloronolysis of ethane or propane. Hexachlorbutadiene may be made by chloronolysis of butane. Octachlorhexatriene may be made by condensation of hexachlorpropylene. In any case the product is more or less contaminated with saturated chlorination products, as well as with chlorinated aldehydes and ketones, acid chlorides and compounds of the phosgene type produced by oxidation during the chlorination stages. Chlorine atoms attached to carbon atoms joined to one or more other carbon atoms by single bonds only, such as occur in all saturated hydrocarbon chlorination products, are known to be relatively loosely bound and hydrolyzable, or liable to split off as HCl. The partially chlorinated olefins are more or less toxic. The oxidation products are corrosive, malodorous, irritant and highly reactive, as well as liable to decompose to acids.

These perchlorolefins are largely used as solvents for dry cleaning, degreasing and other purposes for which it is very necessary that they be free from the above mentioned contaminants. Heretofore, it has been customary to eliminate these objectionable by-products by various treatments depending upon splitting off of the loosely held chlorine atoms, thus leaving the molecule unsaturated. This may be done by contact either with alkalies which combine with the chlorine or with catalysts which promote splitting off of chlorine and hydrogen as HCl. Among such catalysts are the metal chlorides, or finely divided metals forming such chlorides. These metal chlorides are not consumed in the process and represent a considerable item of expense; also they introduce a filtration step.

I have now discovered that crude perchlorolefins of the above specified group may be purified by refluxing with a weak aqueous solution of an alkali metal hydrosulphide, such as a 1 per cent solution of sodium hydrosulphide, to convert the organic impurities therein to the corresponding mercaptans, and then washing in an aqueous alkali solution, such as a 10 per cent solution of caustic soda, to convert the mercaptans to sulphides, which are largely soluble in the alkali solution. The organic layer containing the product is then separated from the aqueous layer. The product is dried by contact with solid caustic alkali, preferably in flake form, and fractionated.

It should be noted that in the processes of the prior art the saturated chlorination products are caused to give up chlorine, or hydrogen chloride, which they do with comparative reluctance, because the molecule is thereby left in an unsaturated condition. In my process, on the other hand, such products are caused to exchange chlorine for an SH group, which they do more readily and completely.

It should also be noted that although after my purification treatment I treat the product with aqueous caustic alkali, this does not serve to split off hydrolyzable chlorine as in the prior art, since such chlorine has already been replaced by an SH group. The caustic alkali therefore serves an entirely different purpose from that of the prior art; namely to convert any hydrosulphide to the sulphide, and get the resulting sulphide into the form of an aqueous solution, which is then readily separated from the product in the non-aqueous layer.

*Example I*

A sample of crude tetrachlorethylene was treated with an equal volume of a cold 10 per cent solution of benzidine in benzene, and allowed to stand for 12 hours in darkness, as described in Patent 2,000,881. A thick yellow flocculent precipitate formed, indicating the presence of impurities containing hydrolyzable chlorine.

324 grams of the same tetrachlorethylene were refluxed for three hours with 3.3 grams of NaSH, in a 1 per cent aqueous solution. The loss in weight during this operation was 0.612 per cent. The mixture was poured into an aqueous solution of NaOH and agitated therewith for about 20 minutes to convert the mercaptan to the sulphide and remove color and acidity. The non-aqueous phase was separated from the aqueous phase and dried by passing it through flake NaOH and then fractionated. The fraction boiling at 120.3° to 120.8° C. was taken off as product. The product had an acidity of 0.0014 per cent. Under the benzidine test, it remained colorless.

*Example II*

A sample of hexachlorbutadiene, which in the course of its manufacture had already been fractionated and thus to a large extent purified, was agitated with sodium bicarbonate at 95° C. in accordance with the procedure of the standard Navy hydraulic stability test. It showed hydrolyzable chlorine amounting to 0.35 mg. per ml.

500 grams of this hexachlorbutadiene were refluxed with 10 grams of NaSH, for five hours at 125° C. and then agitated with a 10 per cent solution of NaOH for two hours at 95° C. The organic layer was removed, dried for two hours in contact with flake NaOH, and fractionated in a four foot packed column at a reflux ratio of about 4 to 1. The fraction obtained at 211° to 214° C. was washed with cold 5 per cent NaOH solution and dried for one hour with flake NaOH. The Navy hydraulic stability test showed that the hydrolyzable chlorine had been further diminished to only 0.087 mg. per ml.

Although I have described my process in its preferred embodiment, I do not wish to be strictly limited thereto, nor to the reagents or concentrations given, or to any particular theory, as in its broadest aspect my process consists in subjecting the organic impurities to the action of sulphur, to convert them to compounds which are soluble in aqueous alkali solutions, and mechanically separating them in aqueous solution from the product; and any procedure which accomplishes this result, whether by the use of a hydrosulphide or by a different sulphiding agent, such as an alkali metal sulphide or polysulphide, comes within the scope of my invention.

I claim as my invention:

1. The process for treatment of perchloroolefins in which every carbon atom in the molecule is joined to one or more other carbon atoms by a linkage including a double bond, to remove therefrom organic impurities containing hydrolyzable chlorine, which comprises refluxing the material with an aqueous solution of an alkali metal hydrosulphide; treating the resulting reaction mixture with an alkali metal hydroxide; separating the organic layer from the aqueous layer; drying the organic layer; and fractionating the organic layer to recover the purified product therefrom.

2. The process for treatment of perchloroolefins of the group consisting of tetrachlorethylene, hexachlorbutadiene and octachlorhexatriene, to remove therefrom organic impurities containing hydrolyzable chlorine, which comprises refluxing the material with an aqueous solution of an alkali metal hydrosulphide; treating the resulting reaction mixture with an alkali metal hydroxide; separating the organic layer from the aqueous layer; drying the organic layer; and fractionating the organic layer to recover the purified product therefrom.

3. The process for treatment of perchloroolefins in which every carbon atom in the molecule is joined to one or more other carbon atoms by a linkage including a double bond, to remove therefrom organic impurities containing hydrolyzable chlorine, which comprises refluxing the material with an aqueous solution of an alkali metal hydrosulphide; treating the resulting reaction mixture with a substantially 10 per cent aqueous solution of an alkali metal hydroxide; separating the organic layer from the aqueous layer; drying the organic layer; and fractionating the organic layer to recover the purified product therefrom.

4. The process for treatment of perchloroolefins in which every carbon atom in the molecule is joined to one or more other carbon atoms by a linkage including a double bond, to remove therefrom organic impurities containing hydrolyzable chlorine, which comprises refluxing the material with an aqueous solution of an alkali metal hydrosulphide; treating the resulting reaction mixture with a hot aqueous solution of an alkali metal hydroxide; separating the organic layer from the aqueous layer; drying the organic layer; and fractionating the organic layer to recover the purified product therefrom.

5. The process for treatment of perchloroolefins in which every carbon atom in the molecule is joined to one or more other carbon atoms by a linkage including a double bond, to remove therefrom organic impurities containing hydrolyzable chlorine, which comprises refluxing the material with an aqueous solution of an alkali metal hydrosulphide; treating the resulting reaction mixture with an aqueous solution of an alkali metal hydroxide at substantially 95° C.; separating the organic layer from the aqueous layer; drying the organic layer; and fractionating the organic layer to recover the purified product therefrom.

6. The process for treatment of perchloroolefins in which every carbon atom in the molecule is joined to one or more other carbon atoms by a linkage including a double bond, to remove therefrom organic impurities containing hydrolyzable chlorine, which comprises refluxing the material with an aqueous solution of an alkali metal hydrosulphide; treating the resulting reaction mixture with an alkali metal hydroxide; separating the organic layer from the aqueous layer; drying the organic layer by contact with solid flake caustic alkali; and fractionating the organic layer to recover the product therefrom.

7. The process for treatment of perchloroolefins in which every carbon atom in the molecule is joined to one or more other carbon atoms by a linkage including a double bond, to remove therefrom organic impurities containing hydrolyzable chlorine, which comprises refluxing the material with an aqueous solution of an alkali metal hydrosulphide; treating the resulting reaction mixture with an aqueous solution of an alkali metal hydroxide; separating the organic layer from the aqueous layer; drying the organic layer; fractionating the organic layer to recover the purified product therefrom; treating the recovered product with more aqueous solution of a caustic alkali to neutralize it; and drying the product again.

JAMES S. SCONCE.

REFERENCES CITED

The following references are of record in the file of this patent:

UNITED STATES PATENTS

| Number | Name | Date |
|---|---|---|
| 2,212,106 | Yabroff | Aug. 20, 1940 |